(12) United States Patent
Kumar (10) Patent No.: US 8,341,235 B2
(45) Date of Patent: *Dec. 25, 2012

(54) CREATING RICH EXPERIENCES IN MAIL THROUGH ATTACHMENTS

(75) Inventor: Abhishek Kumar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,351

(22) Filed: Mar. 6, 2012

(65) Prior Publication Data

US 2012/0166569 A1  Jun. 28, 2012

Related U.S. Application Data

(63) Continuation of application No. 12/759,647, filed on Apr. 13, 2010, now Pat. No. 8,156,189.

(51) Int. Cl.
*G06F 15/16* (2006.01)
(52) U.S. Cl. ......... 709/206; 709/203; 709/217; 709/219
(58) Field of Classification Search .................. 709/206; 345/156; 455/566
See application file for complete search history.

(56) References Cited

U.S. PATENT DOCUMENTS

| 7,266,847 | B2 | 9/2007 | Pauker et al. |
| 7,548,952 | B2 | 6/2009 | Delia et al. |
| 7,698,745 | B2 | 4/2010 | Pauker et al. |
| 7,996,045 | B1* | 8/2011 | Bauer et al. .................... 455/566 |
| 8,037,021 | B2* | 10/2011 | Adler et al. .................... 709/206 |
| 2002/0067338 | A1* | 6/2002 | Adan et al. ..................... 345/156 |
| 2003/0225837 | A1 | 12/2003 | Delia et al. |
| 2005/0071632 | A1 | 3/2005 | Pauker et al. |
| 2009/0319618 | A1* | 12/2009 | Affronti et al. ............... 709/206 |
| 2010/0161984 | A1 | 6/2010 | Pauker et al. |

OTHER PUBLICATIONS

Notice of Allowance dated Jan. 26, 2012, U.S. Appl. No. 12/759,647.

* cited by examiner

*Primary Examiner* — Quang N Nguyen
(74) *Attorney, Agent, or Firm* — Weaver Austin Villeneuve & Sampson LLP (57) ABSTRACT

The disclosed embodiments provide for an email and messenging system that allows a user composing a message to select an application which will appear next to the composition screen at both the sending and receiving computer. The application is specified as an attachment at the sending client and when received at a receiving client of a user with an enhanced or compliant mail/messenging account the application will be executed at the receiving client, thus customizing the functionality of the receiving client computer and the mail experience between sender and receiver. An unapproved application sent as an attachment will not be executed and/or alter the receiving client interface. Similarly, the application will simply appear as a standard attachment at a non enhanced recipient client/account.

20 Claims, 6 Drawing Sheets

CREATING RICH EXPERIENCES IN MAIL THROUGH ATTACHMENTS

RELATED APPLICATION DATA

The present application is a continuation of and claims priority under 35 U.S.C. 120 to U.S. patent application Ser. No. 12/759,647 for Creating Rich Experiences in Mail Through Attachments filed on Apr. 13, 2010, now U.S. Pat. No. 8,156,189 issued on Apr. 10, 2012, the entire disclosure of which is incorporated herein by reference for all purposes.

BACKGROUND OF THE INVENTION

This invention relates generally to email and electronic messaging systems.

Current email systems allow basic file attachments to be sent through emails. However, the files are simply downloaded and opened and do not alter the email experience and associated user interfaces of the email systems.

There is little that a user may currently do to alter the experience one has when opening, reading, or responding to a message and file he or she sends or receives.

SUMMARY OF THE INVENTION

Embodiments make the mail experience enriching and engaging through applications that can be seamlessly sent across as an attachment. An email system server, network infrastructure, and user interfaces enable the sender to choose applications that are then executed by the computing device of the message recipient and serve to customize both the sender and the recipients' email sending and receiving environment.

One aspect relates to a computer system for providing email to a group of users. The computer system comprises a group of email delivery servers. The system and servers are configured to: cause a message composition and display screen of a user interface to be rendered at a first client computer; cause a gallery of applications to be displayed adjacent the message composition screen, the gallery of applications comprising a plurality of applications that may be sent as attachments to a message; receive an application attachment selection input selected from the gallery at the first client computer; and cause the selected application attachment to be transmitted by the email delivery servers to a second client computer. The transmitted application attachment when received causes the second client computer to display at least one gallery application adjacent to a message composition and display screen of a user interface of the second client computer.

Another aspect relates to a computer implemented method of operating an electronic mail system. The method comprises: causing a message display and composition screen to be displayed at a first client computer, the message display and composition screen having a mail display and composition area occupying a portion of a browser window; receiving, at one or more servers of the electronic mail system, an indication from the first client computer that a first user has initiated composition of a message at the first client; causing a gallery of applications to be displayed adjacent the message display and composition area within the browser window; receiving at the servers of the electronic mail system an indication that the first user wishes to send one of the applications within the gallery as an attachment to the message composed at the first client; delivering the application as an attachment to a message from the first client computer to a second client computer with the servers of the electronic mail system; and causing the attached application to be automatically executed and displayed adjacent a message display and composition area within a browser window of a second client computer.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments make the mail experience enriching and engaging by using applications that can be seamlessly sent across as an attachment. An email system server, network infrastructure, and user interfaces enable the sender to choose applications that are then executed by the computing device of the message recipient and serve to customize both the sender and the recipients' email sending and receiving environment.

This not only provides additional experiences to the email message but also makes it interactive, provides the ability to express emotions, and facilitates comprehension of the message and/or state of the user. A single mail conversation could have multiple of these applications attached to make the whole conversation enriching and engaging.

The attachments may also comprise functions that update in real time (or close to real time). For example, a poll application can update the tally of a poll or list. There are a fair amount of mail conversations that are intended to get opinions on a topic. For example, in a conversation seeking an opinion on a topic such as an outing over a weekend, numerous email messages may go back and forth with opinions/votes over the outing. In this case an application that supports 'polls' which reflect real time data may be chosen by a participant in the thread and will be displayed for the sender and recipients. It will allow them enhance their experience, make decisions quickly about the trip, and also cut down on the mails they have to send and read.

Also, what is missing from the conventional text mail is the aspect of sender's emotional mood or state. Text essentially cannot effectively convey a mood. Allowing users to add other mediums can help in conveying emotional aspects. For example, a user may add songs (audio) and photos to 'express' his/her emotional state along with the text conversation. An audio application will play the audio and optionally appear in the gallery and a photo application will appear in the recipient's gallery and display the photos.

An integrated yet modular system provides an 'integrated experience' to allow these different kinds of files, links, expressions or real time updated/actions to be experienced without leaving the mail application.

Figure 1A:
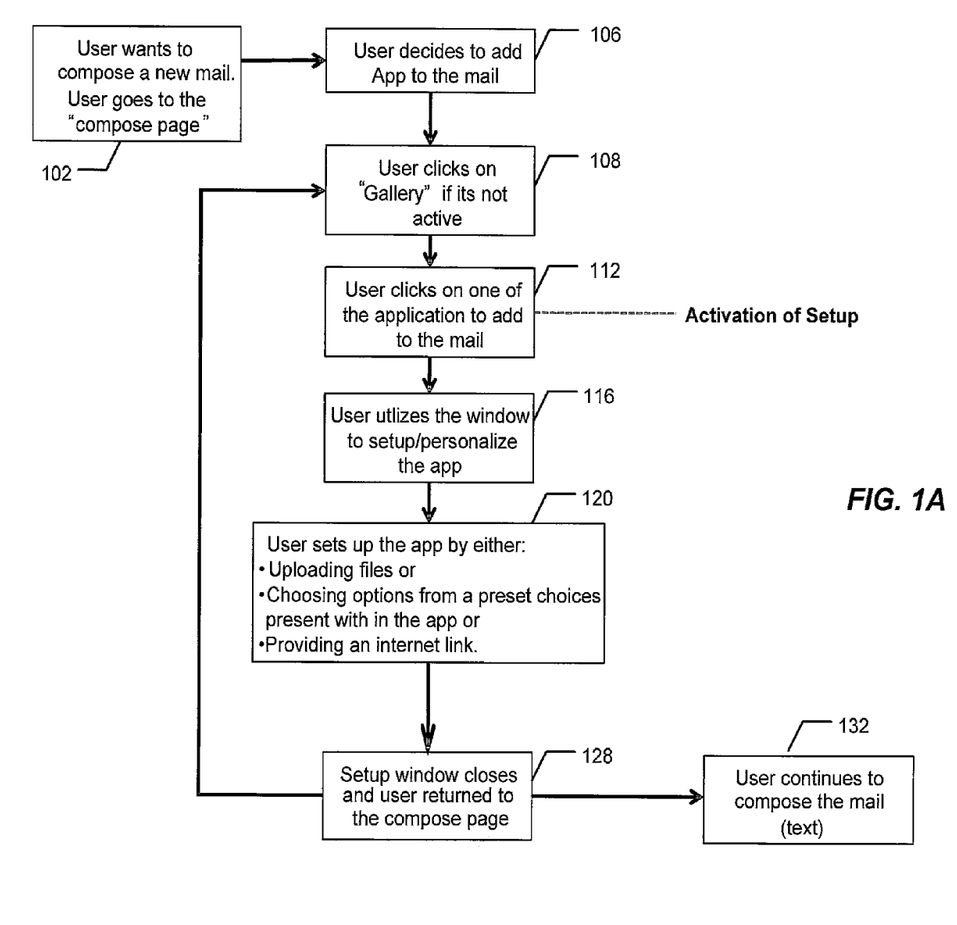
FIG. 1A is a flow chart depicting message composition.

FIG. 1A is a flow chart depicting message composition. In step 102, a user that wishes to compose a new message goes to a message composition page or screen displayed by an email/messaging provider (described later with regard to FIG. 4). Then in step 106, the user decides to add an application to the message. This may be a default option on the screen or may be prompted by a user action calling for the option to add an application. In step 108 the user then clicks on a button that will display a gallery of applications available to the user to add to a message, if the gallery is not already displayed. The system will allocate screen area to the gallery so that the gallery may be simultaneously displayed along with the standard message composition area and controls (without invoking a pop up or additional browser window that may overlap with the main messaging area). In this way, the user can continue to type in text in a message or chat while simultaneously viewing the actions taking place in the gallery applications. In one embodiment, the gallery of options is displayed to the right of the composition area, as seen in FIG. 1C. Some applications in the gallery, once directed by the user, may produce additional screens, such as, for example, a slideshow. However, the gallery and the associated applications will not create screens that block the message composition area and controls without additional commands from the user that call for further functions or other enlargement of a gallery display area. The gallery may be personalized by marking selected applications as favorites or by any other methods, for example by tracking the number of times the app is used and displaying the most frequently used, or by displaying the more recently used applications etc.

In step 112 the user selects and clicks on one of the applications to add to the message. This activates the setup process. In step 116, the system displays a window that allows the user to set up or personalize the application. Then in step 120, the user sets up the application by either uploading files, choosing options from a group of present choices available within the application or by providing an internet link, e.g. a URL. In step 128 the setup window closes and the user is returned to the message composition page.

Figure 1B:
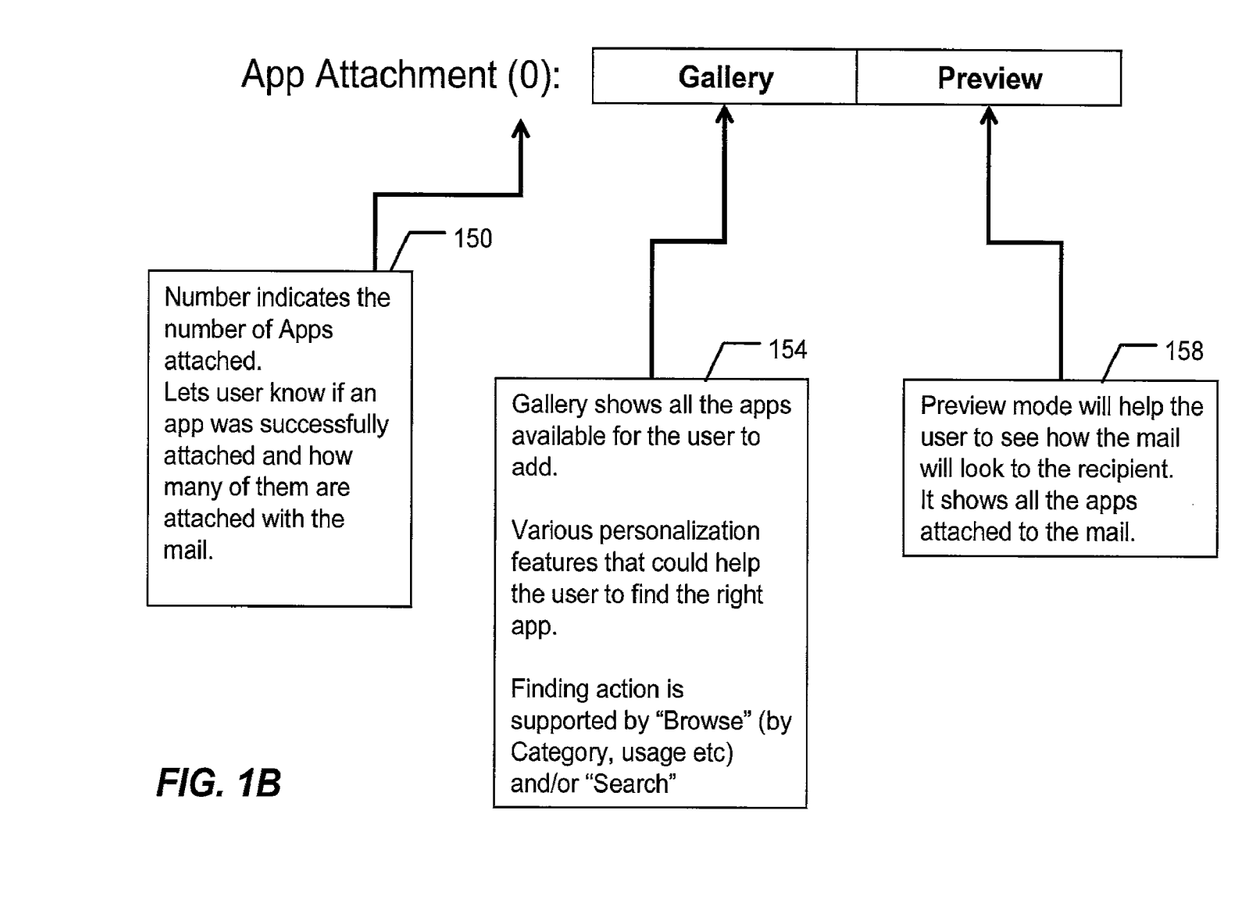
FIG. 1B illustrates application attachment modes in a mail composition page.
Figure 1C:
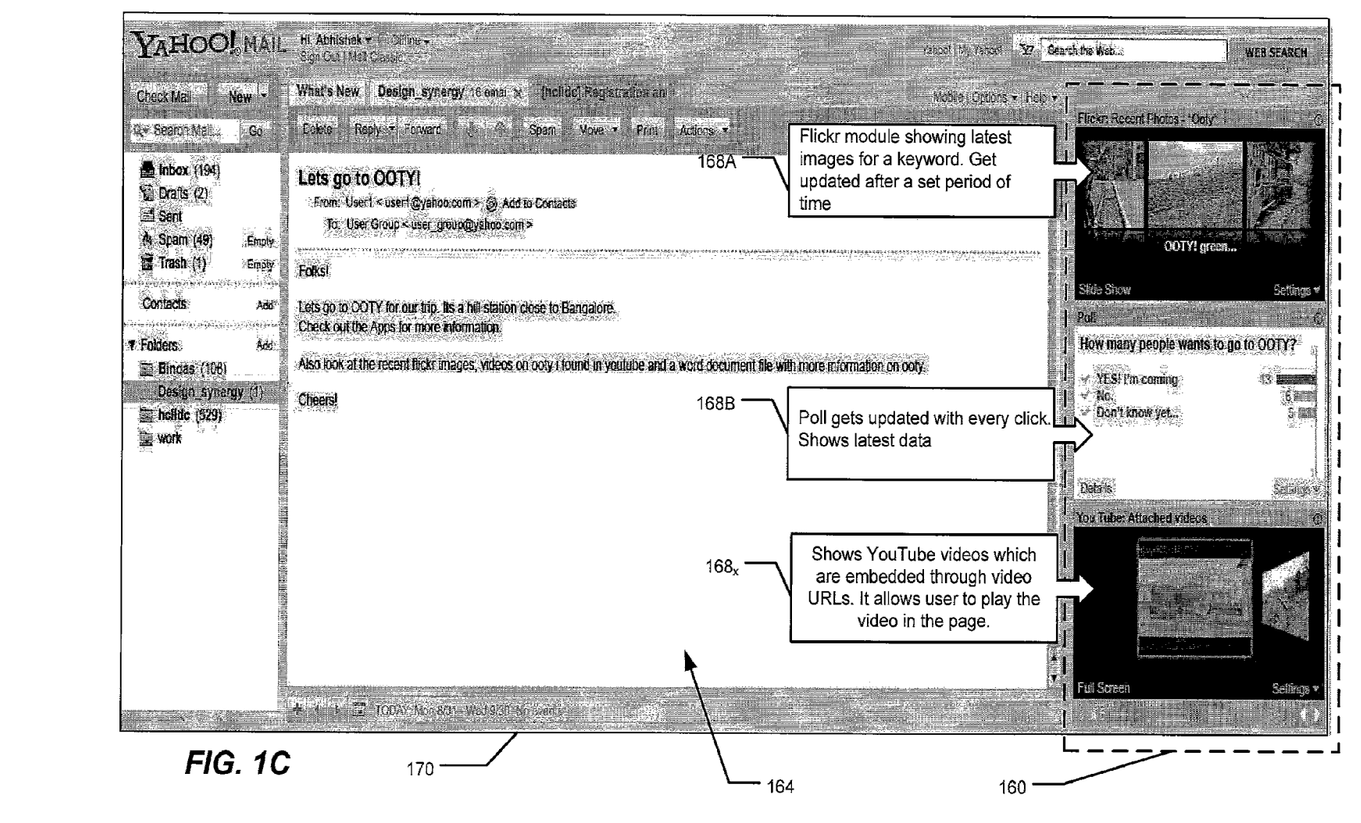
FIG. 1C illustrates a user interface screen according to an embodiment.

FIG. 1B illustrates application attachment modes in a mail composition page.

Application attachment indicator 150 indicates the number of attachments that have been successfully attached to the mail. The gallery indicator 154 displays, as a list or in graphical format, all of the applications that are available for a user to add. An example of the gallery is shown in FIG. 1C. The gallery 160 is shown to the right of the message display and composition area 164 of browser window 170. The gallery comprises applications 168A . . . x that are automatically executed by the recipient computing device used to access mail/messages of a mail provider and mail system having such enhanced functionality. Examples of such applications are polls, audio, video, photos, maps etc. A preview indicator and button (not shown) activates a preview mode that helps the user to see how the mail will look to the recipient. Again, because the attachments, are not simply files that get sent along with an email as in prior email solutions, but rather are applications that change the recipients user interface and the way the user interacts with the email/messenging system, this is advantageous to the email composer. For example, the composer may preview how a first attachment will change the user interface of the recipient, and decide he prefers to utilize a second attachment because he prefers the second type of user interface and related experience it creates for the recipient. In the case of a "standard" mail provider/system that does not support the enhanced gallery functionality, the files associated with the application attachments (e.g. photos or videos) are delivered as standard file attachments.

Figure 2A:
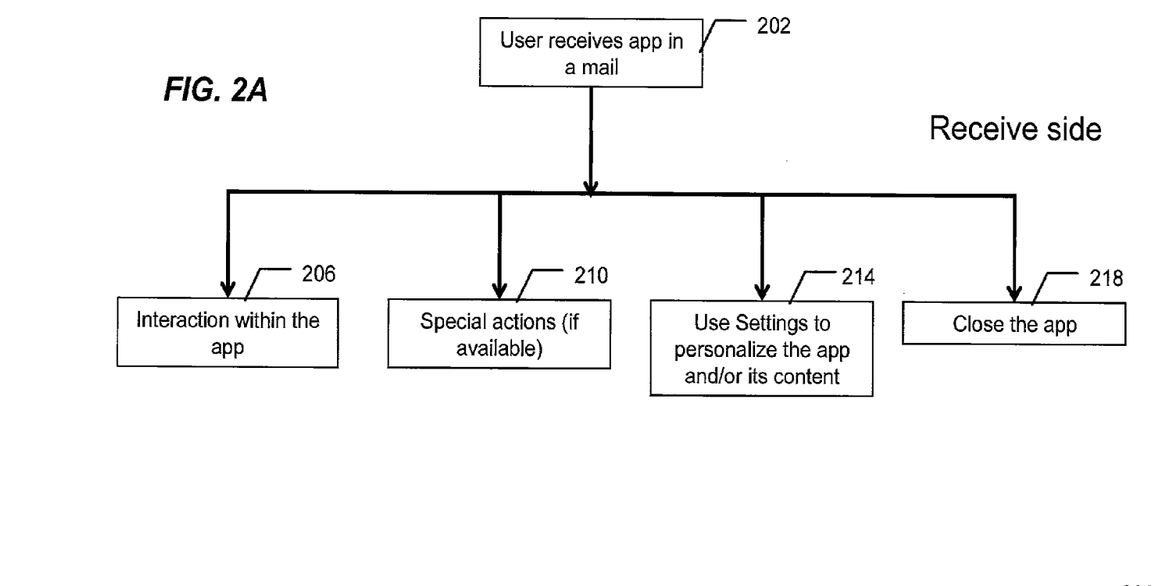
FIG. 2A depicts mail interaction for a recipient user.

FIG. 2A depicts mail interaction for a recipient user. In step 202, the recipient user receives a message with an embedded application. The application will be executed by the mail system in conjunction with the recipient's (client) computing device upon retrieval, and will alter the user's interface, as previously noted. The user may interact with the application, as represented by step 206. For example, the user may browse photos displayed within the application or answer a poll that is presented. Special actions may be available as represented by box 210, for example, a slide show for a Flickr® application may be displayed, or the user may be asked to reply to a chat. Settings options may be presented to recipient user and the user may adjust the setting to personalize the application and/or its content, as represented by box 214. For example the user may select a safe search option in an image searching application, may implement filters on (e.g. RSS) feeds, may customize display options such as the location, size, color scheme, additional window option etc of the application interface. The user, may also block other sending users from sending him images, message, or other attachments or the like if appropriate.

Figure 2B:
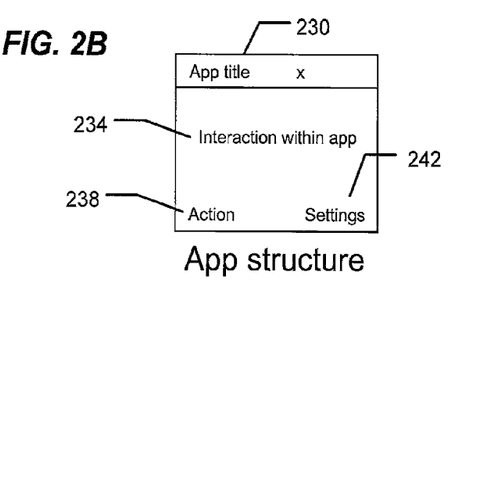
FIG. 2B is a generalized depiction of a user interface of an application for a recipient user.

FIG. 2B is a generalized depiction of a user interface of an application interface for a recipient user. In general, the interface may comprise a title area 230, a primary interaction area 234, an action are or buttons 238, and a setting area or buttons 242.

Figure 3:
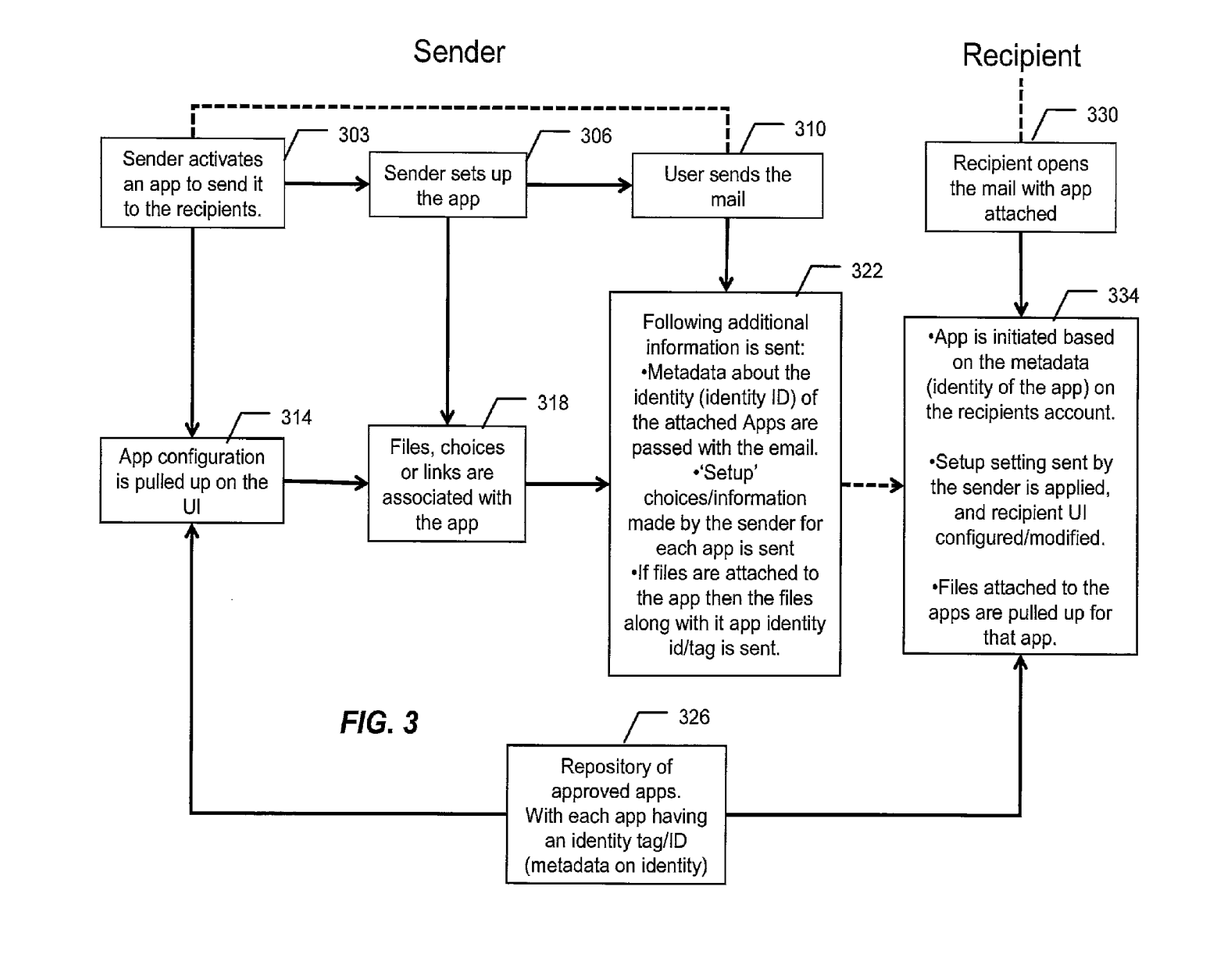
FIG. 3 is an illustration depicting the system level interactions with a message sender and recipient.

FIG. 3 is an illustration depicting the system level interactions with a message sender and recipient. In step 302, a sender activates an application to send it to one or more recipients. In step 314 the system will cause the application to be displayed on the user interface. In step 306, the sender utilizes and/or sets up the application depending on the application and what the user wishes to achieve. In step 318, the files or choices, or links chosen by the user are associated with the application by the system. In step 310, the user sends the mail, and in step 322, the system sends the following information to the recipient's computing device: metadata about the identity (identity ID) of each of the attached applications; setup choices/information made by the sender for each of the applications.

When the recipient opens the with the application attached in step 330, which may be before or after step 334, the application chosen by the sender will be initiated by the system based on the sent metadata. The system will apply the settings of the sender and/or any established preferences set by the recipient in executing the applications upon receipt and/or opening of the message by the recipient. Files attached to the applications e.g. pictures, documents etc are pulled up by the application. Both steps 314 for the sender side, and 334 for the recipient side rely on and pull from a repository of approved applications, wherein each application has a identity tag in metadata of the application and/or email message, as represented by box 326. The approval of apps and the repository of approved apps alleviates the dangers associated with executing attached files. For example, executing a malicious executable file attached to a mail message may destroy a hard drive or turn the receiving computer into a "bot" that sends out spam or other malicious files. This is one reason why prior mail systems do not support auto execution of attached files.

Note that auto execution of applications is not supported by prior systems, and that messages with applications attached will not be executed and/or displayed in gallery format. For such messages sent to systems that do not support such an interface the applications and any attached files sent will be shown as normal attachments. Other interactive apps will not be shown.

There could be spam mails with app-attachments. To avoid this users can put up settings that allow only their "contacts/friends/people in their address book" to send them apps.

Figure 4:
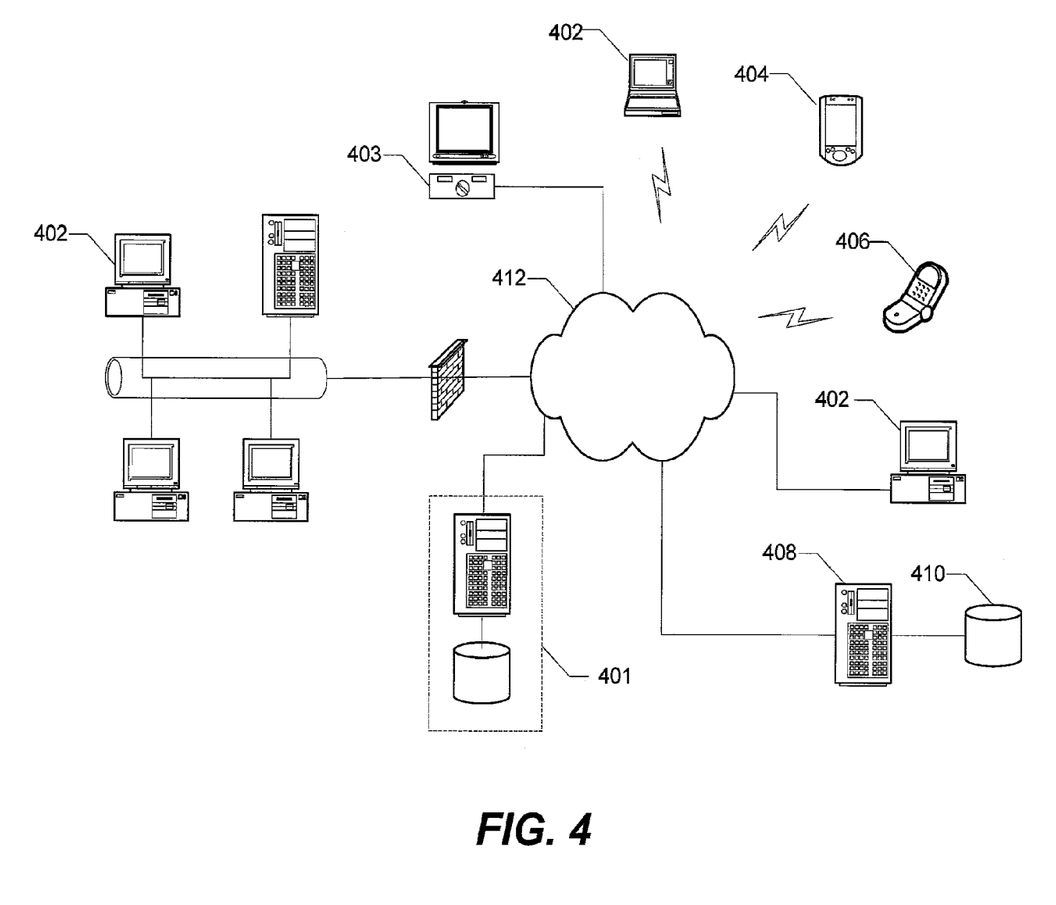
FIG. 4 is a simplified diagram of a computing environment in which embodiments of the invention may be implemented.

Such an email system may be implemented as part of a larger network, for example, as illustrated in the diagram of FIG. 4. Implementations are contemplated in which a population of users interacts with a diverse network environment, accesses email and uses search services, via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online email and search services such as those provided by Yahoo! Inc. (represented by computing device and associated data store 401).

Regardless of the nature of the email service provider, email may be processed in accordance with an embodiment of the invention in some centralized manner. This was discussed previously with regard to FIG. 4B and is represented in FIG. 4A by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

The modular approach employed by the disclosed embodiments has advantages over other approaches to enrich mail and messenging systems. Text (Language) is linear. If, for example, the apps were embedded into the message they would lie in a sequence of the text message. This may not be desirable in some instances. Separating the apps from the text and composition of the message allows for the app to go along with the message but to alleviates placement of the app within the string sequence of the message.

The modular approach also allows for independent actions to be conducted in the apps like: replying to a chat, making the image preview full screen, providing Safe Search options to image search RSS feeds, etc. This allows for more control of these apps without disturbing the message—this control can be both for the sender and the recipient. For example, the sender sends an app that shows images for keyword "India"; the recipient further refine this app to only show images which are "recent only" or within a specified portion of India. With the modular approach the user can choose to 'close' certain apps without disturbing the text message and other apps.

Attached apps can behave the same way normal attachments behave in replying and forwarding the messages, whether between users of systems with the enhanced gallery capabilities of between one system with and one system without the capability. Thus, while the embodiments greatly enhance the user experience when compatible systems are used, they also do not detract from functionality when non enhanced systems, are used by recipients, and little in the way of learning is required from the sending and receiving users to handle apps.

The computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations. In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system for providing email to a group of users, the computer system comprising:
   a group of email delivery servers configured to:
      cause a message composition and display screen of a user interface to be rendered at a first client computer;
      cause a gallery of applications to be displayed adjacent the message composition screen, the gallery of applications comprising a plurality of applications that may be sent as attachments to a message;
      receive an application attachment selection input selected from the gallery at the first client computer; and
      cause the selected application attachment to be transmitted by the email delivery servers to a second client computer;
      wherein the transmitted application attachment when received causes the second client computer to display at least one gallery application adjacent to a message composition and display screen of a user interface of the second client computer.

2. The computer system of claim 1, wherein the email servers are further configured to maintain a repository of approved applications.

3. The computer system of claim 2, wherein the email servers are further configured to cause approved applications to be displayed in the gallery at the first client computer.

4. The computer system of claim 3, wherein the email servers are further configured to transmit a non approved application as an attachment that does not get displayed at the gallery.

5. The computer system of claim 1, wherein the email servers are further configured to associate files with the selected application, and to transmit the files with the application.

6. The computer system of claim 1, wherein the email servers are further configured to associate user configuration choices for the selected application.

7. The computer system of claim 6, wherein the email servers are further configured to transmit associated user configuration choices for the selected application to the second client computer.

8. The computer system of claim 1, wherein the email servers are further configured to cause the first client computer to generate a preview of what a message with the selected attachment will appear like at the second client computer.

9. A computer implemented method of operating an electronic mail system, the method comprising:

causing a message display and composition screen to be displayed at a first client computer, the message display and composition screen having a mail display and composition area occupying a portion of a browser window;

receiving, at one or more servers of the electronic mail system, an indication from the first client computer that a first user has initiated composition of a message at the first client;

causing a gallery of applications to be displayed adjacent the message display and composition area within the browser window;

receiving at the servers of the electronic mail system an indication that the first user wishes to send one of the applications within the gallery as an attachment to the message composed at the first client;

delivering the application as an attachment to a message from the first client computer to a second client computer with the servers of the electronic mail system; and causing the attached application to be automatically executed and displayed adjacent a message display and composition area within a browser window of a second client computer.

10. The computer implemented method of claim 9, further comprising maintaining a repository of approved applications at one or more of the electronic mail servers.

11. The computer implemented method of claim 10, further comprising causing approved applications to be displayed in the gallery at the first client computer.

12. The computer implemented method of claim 11, further comprising delivering a non approved application as standard attachment that does not get displayed at the gallery.

13. The computer implemented method of claim 9, wherein the email servers are further configured to associate files with the selected application, and to transmit the files with the application.

14. The computer implemented method of claim 9, wherein the method further comprises associating user configuration choices for the selected application.

15. The computer implemented method of claim 14, wherein the method further comprises transmitting associated user configuration choices for the selected application to the second client computer.

16. The computer implemented method of claim 9, wherein the method further comprises causing the first client computer to generate a preview of what a message with the selected attachment will appear like at the second client computer.

17. A computer program product for operating an electronic mail system, comprising at least one non-transitory computer-readable medium having computer program instructions stored therein configured such that, when executed by one or more computing devices, cause the one or more computing devices to:

cause a message display and composition screen to be displayed at a first client computer, the message display and composition screen having a mail display and composition area occupying a portion of a browser window;

receive an indication from the first client computer that a first user has initiated composition of a message at the first client;

cause a gallery of applications to be displayed adjacent the message display and composition area within the browser window;

receive an indication that the first user wishes to send one of the applications within the gallery as an attachment to the message composed at the first client;

deliver the application as an attachment to a message from the first client computer to a second client computer; and cause the attached application to be automatically executed and displayed adjacent a message display and composition area within a browser window of a second client computer.

18. The computer program product of claim 17, wherein the computer program instructions are further configured to cause the one or more computing devices to maintain a repository of approved applications.

19. The computer program product of claim 18, wherein the computer program instructions are further configured to cause the one or more computing devices to cause approved applications to be displayed in the gallery at the first client computer.

20. The computer program product of claim 19, wherein the computer program instructions are further configured to cause the one or more computing devices to cause approved applications selected by a user at the first client computer to be displayed in the gallery at the second client computer.

* * * * *